United States Patent [19]

McFadden

[11] Patent Number: 4,540,752
[45] Date of Patent: Sep. 10, 1985

[54] EPOXY COATING COMPOSITIONS WITH IMPROVED WEATHERABILITY

[75] Inventor: Russell T. McFadden, Freeport, Tex.

[73] Assignee: The Dow Chemical Company, Midland, Mich.

[21] Appl. No.: 581,469

[22] Filed: Feb. 17, 1984

[51] Int. Cl.³ ............... C08F 283/10; C08G 59/00
[52] U.S. Cl. ............................. 525/531; 526/320; 528/112; 528/365; 528/406
[58] Field of Search ............. 528/406, 112, 365; 526/320; 525/531; 204/159.14, 159.15, 159.16

[56] References Cited

U.S. PATENT DOCUMENTS

| | | | |
|---|---|---|---|
| 2,868,760 | 1/1959 | Stalcopoulos | 260/41 |
| 2,895,929 | 7/1959 | Yusem | 260/21 |
| 3,215,757 | 11/1965 | Scheibli et al. | 260/837 |
| 3,305,501 | 2/1967 | Spalding | 260/18 |
| 3,378,601 | 4/1968 | Tamaka et al. | 260/831 |
| 3,707,516 | 12/1972 | Walus | 260/21 |
| 3,736,289 | 5/1973 | Marshall | 528/112 |
| 3,816,557 | 6/1974 | Swanson et al. | 260/837 |
| 4,014,771 | 3/1977 | Rosenkranz et al. | 525/531 |
| 4,085,018 | 4/1978 | Ariga et al. | 525/531 |
| 4,107,114 | 8/1978 | Nakayama et al. | 260/22 CB |
| 4,143,090 | 3/1979 | Vargiu et al. | 525/531 |
| 4,289,866 | 9/1981 | Ritz et al. | 526/320 |
| 4,294,737 | 10/1981 | Sekmakas et al. | 260/29.2 EP |
| 4,413,105 | 11/1983 | Koenig | 525/531 |

FOREIGN PATENT DOCUMENTS

| | | |
|---|---|---|
| 1169135 | 12/1964 | Fed. Rep. of Germany . |
| 3101343 | 12/1982 | Fed. Rep. of Germany . |
| 57-105415 | 6/1982 | Japan . |
| 770080 | 3/1957 | United Kingdom . |
| 1227008 | 3/1971 | United Kingdom . |

*Primary Examiner*—Herbert S. Cockeram
*Attorney, Agent, or Firm*—James G. Carter

[57] ABSTRACT

Solvent soluble epoxy-containing compositions prepared by polymerizing ethylenically unsaturated monomers such as alkyl acrylates in the presence of the reaction product of a liquid epoxy resin such as a diglycidyl ether of bisphenol A and acrylic acid and/or methacrylic acid. These compositions are useful in the preparation of coatings.

6 Claims, No Drawings

EPOXY COATING COMPOSITIONS WITH IMPROVED WEATHERABILITY

BACKGROUND OF THE INVENTION

The present invention is directed to epoxy resins having improved weathering properties.

Epoxy resin coatings, particularly aromatic epoxy resin coatings usually have poor weathering characteristics. The aliphatic based epoxy resins usually have relatively good weathering characteristics but are usually deficient in such properties as a combination of hardness and flexibility (toughness) and chemical, solvent, and moisture resistance.

The epoxy resin coatings of the present invention not only have good weathering properties, they also have sufficiently good properties in one or more of the following: chemical, solvent, and moisture resistance, hardness, adhesion, and flexibility.

SUMMARY OF THE INVENTION

The present invention pertains to a solvent soluble epoxy-containing composition which comprises the product obtained by reacting in the presence of a suitable quantity of a suitable vinyl polymerization catalyst so as to effect polymerization:

(A) the reaction product obtained by reacting in the presence of a suitable quantity of a suitable catalyst
  (1) at least one material having from greater than 1 to about 4

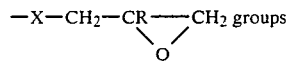 groups per molecule wherein each R is independently hydrogen or a monovalent hydrocarbon group having from 1 to about 4 carbon atoms; X is —O—, —S— or

and wherein said material has an epoxide equivalent weight of from about 150 to about 400, preferably from about 180 to about 270; and (2) at least one of acrylic acid or methacrylic acid; wherein components (1) and (2) are present in a quantity which provides an equivalent ratio of acid groups from component (2) to epoxy groups from component (1) of from about 0.1:1 to less than about 0.5:1, preferably from about 0.2:1 to about 0.3:1; and (B) at least one monomer having at least one polymerizable ethylenically unsaturated group per molecule and which optionally contains a hydroxyl or an epoxide group; and wherein components (A) and (B) are employed in quantities such that the weight ratio vinyl monomers to epoxy resin varies from 0.4 to 2.5, preferably from 0.6 to 1.5.

The present invention also pertains to a curable composition which comprises (I) the aforementioned epoxy-containing composition;
(II) optionally a suitable quantity of a suitable solvent system; and
(III) an effective quantity of a suitable curing agent and/or catalyst.

DETAILED DESCRIPTION OF THE INVENTION

Suitable materials having an average of from greater than 1 to about 4

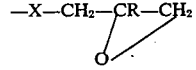

per molecule include the glycidyl ethers, thioethers and esters of aromatic compounds having an average of from greater than 1 to about 4 —OH, —SH, —COOH or mixture of such groups per molecule. Particularly suitable are those compounds represented by the formulas

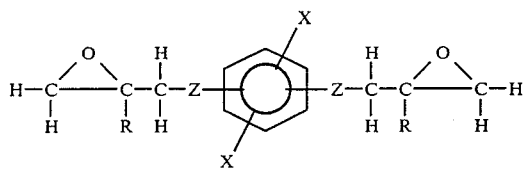

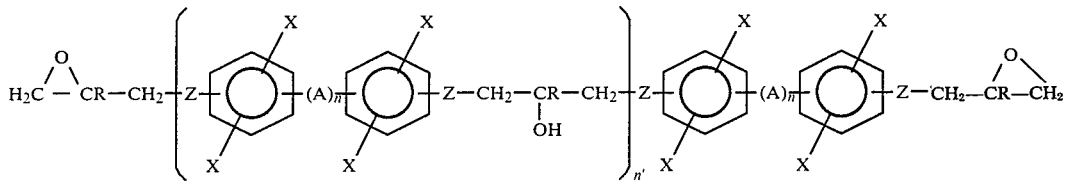

-continued

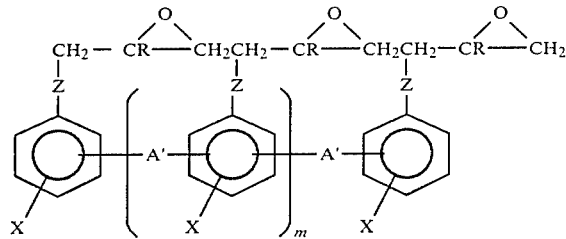

wherein A is independently a divalent hydrocarbon group having from one to about 8 carbon atoms, —O—, —S—, —S—S—,

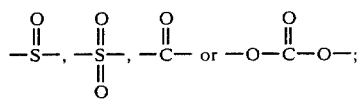

each A' is independently a divalent hydrocarbon group having from one to about 8, preferably from 1 to about 4 carbon atoms; each R is independently hydrogen or a monovalent hydrocarbon group having from 1 to about 4 carbons; each X is independently hydrogen, bromine, chlorine or a hydrocarbon group having from one to about 8 carbon atoms; each Z is independently —O—, —S— or

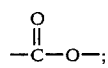

n has a value of zero or 1; n' has an average value of from zero to about 5, preferably from zero to about 3; and m has an average value of from about 0.1 to about 4, preferably from about 0.8 to about 2.

Suitable polymerizable ethylenically unsaturated monomers which can be employed herein include, for example, $C_1$–$C_8$ alkyl esters of acrylic and methacrylic acid; styrene and ring-substituted styrenes; vinyl and vinylidene halides; vinyl esters such as vinyl acetate, vinyl propionate, and the like; ethylene or propylene; dialkyl maleate or fumarate esters; acrylonitrile, mixtures thereof and the like.

Suitable catalysts for reacting the low equivalent weight epoxy resin with the acrylic or methacrylic acid include, for example, phosphines, phosphonium salts, tertiary amines, tertiary ammonium bases and salts, mixtures thereof and the like.

Suitable vinyl polymerization catalysts include, for example, benzoyl peroxide, peroxy ethers, and peroxy esters; and azo compounds such as azobis(isobutyronitrile), mixtures thereof and the like.

Suitable curing agents for the epoxy-containing material include, for example, polyamides, polyamidoamines, polyamines, polythiols, polycarboxylic acids, and carboxylic acid anhydrides, mixtures thereof and the like.

Suitable solvents which can be employed herein include, for example, aromatic hydrocarbons, ketones, esters, alcohols, and glycol ethers having boiling-points above 140° C., or which can be contained by a pressure vessel if their boiling point is below 140° C., mixtures thereof and the like.

In addition to the aforementioned components, the curable compositions of the present invention can include, if desired, pigments, dyes, fillers, flow control agents, fire retardant agents, mixtures thereof and the like.

The following examples are illustrative of the present invention, but are not to be construed as to limiting the scope thereof in any manner.

In the following examples, reference is made to acrylic resin and epoxy resin.

Acrylic resin means a resinous substance, soft or hard at room temperature, formed by the free-radical initiated polymerization of acrylic or methacrylic acid, their esters, or their nitriles with each other, singly, or with other vinyl monomers such as styrene, vinyl acetate, vinyl or vinylidene chloride, maleate esters, ethylene, and the like.

Epoxy resin means resinous substances characterized by containing from 1.0 to about 5, usually 2.0 to 3.5, oxirane groups per molecule, usually as the 2,3-epoxypropylether group. The resin may be a crystalline or amorphous solid, a syrup, or an oily liquid.

EXAMPLE 1

A two-liter spherical Pyrex ® reaction vessel was equipped for mechanical stirring, temperature measurement and control, solvent reflux, and continuous reactants addition by means of a metering pump. To this vessel was charged the following: 452.5 gm of a liquid diglycidyl ether of bisphenol A having an average EEW of 181, 58.0 gm of glacial methacrylic acid, 6.0 gm of a 1% solution of p-methoxyphenol in methyl amyl ketone; and 0.77 gm of a 70% solution of ethyltriphenyl phosphonium acetate.acetic acid complex in methanol as a catalyst. The mixture was stirred and warmed slowly to 120° C., at which point the heat of reaction caused the temperature to rise further to about 135°. It then fell slowly back to 120° where it was held until 2.0 hours (7200 s) after the time it first reached 120° C. At this time the vessel contents were a thin, yellow clear liquid containing <0.05% by weight of methacrylic acid (by gas chromatography). This liquid was cooled, and when the temperature had fallen to 60° C., a mixture of 187 ml of n-butyl acrylate and 206 ml of methyl methacrylate was added and stirred in until a clear, light-yellow liquid solution of resin-in-monomers was obtained (~½ hour, 1800 s). This solution was further cooled to <10° C., and 7.5 ml (7.8 gm) of tert-butyl perbenzoate was added and stirred in. The entire cold solution, 857 ml, was then decanted into a one-liter Pyrex ® reservoir attached to the reaction vessel via a metering pump.

To the now-empty vessel was charged 368.4 gm of methyl n-amyl ketone. Stirring was begun, and heat was applied to bring the liquid temperature to 150° C. as quickly as possible. When the temperature was at 150° C., the resin/monomers feed was started by turning on the metering pump. The pump was adjusted so that feed was completed in 3 hours and 55 minutes (14100 s). The pump hold-up was 20 ml, so the net feed-volume was 837 ml, or about 878 gm. The temperature was held at 150°±2° C. for 2.0 hours (7200 s) after completion of the feed, then the polymer solution was cooled to room temperature and bottled.

It was analyzed and was found to have the following properties.

| | |
|---|---|
| Appearance | Clear, yellow |
| Viscosity at 25° C. | 6820 cps |
| % non-volatiles as: | |
| acrylic resin, wt. | 50.2 |
| epoxy resin, wt. | 19.1 |
| Acrylic resin mol. wt. | |
| $\overline{M}_w$ | $1.77 \times 10^5$ |
| $\overline{M}_n$ | $1.33 \times 10^4$ |
| EEW, liquid basis | 729 |
| EEW, solids basis | 505 |

From the above data it was possible to calculate that the acrylic resin (solids) had an epoxy ($C_2H_3O$) content of 1.98 weight percent and an EEW (epoxide equivalent weight) of 2171, and therefore was functional in epoxy groups to the extent of 6.1 per average polymer molecule:

average functionality, $(\overline{f})_n =$ $$\frac{\text{number average mol. wt., } M_n}{\text{epoxy equivalent wt., } EEW} = \frac{13,300}{2171} = 6.1;$$

that the acrylic copolymer resin crosslink density, $(\overline{X})_n$, was two per average molecule, and that the average molecule had a degree of polymerization of 80–81 ($\overline{D}./=80–81$).

EXAMPLES 2–4 AND COMPARATIVE EXPERIMENTS A–C

The solution prepared in Example 1 was made into clear, catalyzed epoxy coating formulations as shown in Table I. Also included are comparative coatings prepared from an epoxy resin which is a diglycidyl ether of bisphenol A having an average EEW of about 500–525 designated as DGEBA as a 70% solids solution in methyl n-amyl ketone.

TABLE I

| | EXAMPLE OR COMPARATIVE EXPERIMENT NO. | | | | | |
|---|---|---|---|---|---|---|
| COMPONENTS | EXAMPLE 2 | COMP. EXPT. A | EXAMPLE 3 | COMP. EXPT. B | EXAMPLE 4 | COMP. EXPT. C |
| Product from Ex. 1, g | 21.0 | — | 21.0 | — | 21.0 | — |
| DGEBA SOLUTION, g | — | 21.0 | — | 21.0 | — | 21.0 |
| GCH ® 140[1], g | 5.0 | 5.0 | — | — | — | — |
| VERSAMID ® 115 × 70[2], g | — | — | 11.5 | 11.5 | — | — |
| D.E.H. ® 29[3] | — | — | — | — | 1.2 | 1.2 |
| methyl ether of propylene glycol, g | 5.0 | 5.0 | 5.0 | 5.0 | 5.0 | 5.0 |
| methyl ethyl ketone, g | quantity required to provide spray viscosity of 250–300 cP. | | | | | |

[1]A polyamide curing agent having an amine hydrogen equivalent weight of about 175 available from General Mills as Versamid 140.
[2]A polyamide curing agent having an amine hydrogen equivalent weight of about 375 available from General Mills.
[3]A polyamide curing agent having an amine hydrogen equivalent weight of about 29 available from The Dow Chemical Company.

The clear lacquer-like solutions were spread in even films on 4"×12" (10.16 cm×30.48 cm) 20-guage unpolished cold-rolled steel panels and allowed to cure in a vertical position for one week (604800 s) at 24°–27° C. They were then evaluated as shown in Table II.

The results demonstrate that the subject compositions are capable of being formulated to yield coatings having not only superior resistance to dulling and chalking but other properties equal or superior to those of conventional epoxy resin coatings.

TABLE II

| | EXAMPLE OR COMPARATIVE EXPERIMENT NO. | | | | | |
|---|---|---|---|---|---|---|
| PROPERTY | EXAMPLE 2 | COMP. EXPT. A | EXAMPLE 3 | COMP. EXPT. B | EXAMPLE 4 | COMP. EXPT. C |
| GLOSS | excellent | good | excellent | very good | excellent | very good |
| HARDNESS, pencil | 2H–3H | H–2H | F–H | 2H | 2H | H–2H |
| ADHESION (dry) | 100% | 30% | 100% | 56% | 100% | 31% |
| REVERSE IMPACT, in-lb | >180 | >180 | >120 | >180 | >200 | >200 |
| cm-kg | >207 | >207 | >138 | >207 | >230 | >230 |
| MEK DOUBLE RUBS | >200 | >200 | >200 | 100–125 | >200 | >200 |
| LOSS OF ADHESION, 1 hour boiling water water immersion | 16% | 100% | 55% | 100% | 100% | 100% |
| SALT FOG EXPOSURE, 24 hours (86400 s) | ¾" (19 mm) creep in 24 hrs. | gross failure | ½" (12.7 mm) creep | ½"–¾" (12.7 mm–19 mm) creep | gross failure | 1¼"–2" (25.4 mm–50.8 mm) creep |
| QUV EXPOSURE, 500 hours (1,800,000 s) | glossy | completely flat | glossy | completely flat | glossy | completely flat |
| DRY FILM THICKNESS | | | | | | |
| mils | 1.2–1.4 | 1.2–1.3 | 1.0–1.4 | 1.1–1.3 | 1.1–1.4 | 1.0–1.3 |
| mm | 0.03048–0.03556 | 0.03048–0.03302 | 0.0254–0.03556 | 0.02794–0.03302 | 0.02794–0.03556 | 0.0254–0.03302 |

EXAMPLES 5–8

Employing the procedure for Example 1, various compositions were prepared. The components and characteristics are given in Table III.

The purpose of this series of experiments was to demonstrate the preparation and use of a set of copolymer resins in which the molecular weight has been varied by varying the ratio of vinyl carboxylic acid equivalents to glycidyl ether equivalents, short of gellation.

This variable (carboxyl group/epoxy group) is believed to control the molecular weight of the resulting vinyl copolymer by controlling the number of branch sites in the copolymer backbone; i.e., more branch sites results in higher molecular weight copolymer.

When the acid/epoxy ratio in this series was increased to 0.50, the solution gelled during the vinyl polymerization.

components and results are given in Table IV. For comparative purposes, coatings were also prepared from glycidyl ethers of bisphenol A having equivalent weights similar to those of the examples. These comparative epoxy resins are designated in the table as DGEBA. The mixtures were all diluted to a viscosity of 120–145 cps with methyl ethyl ketone. The films were cast onto 24-guage unpolished cold-rolled steel panels and cured by allowing them to stand for one week (604800 s) at 24°–27° C. The compositions and results are given in Table IV.

TABLE IV

| COMPONENTS & PROPERTIES | EXAMPLE 9 | COMP. EXPT. D | EXAMPLE 10 | COMP. EXPT. E | EXAMPLE 11 | COMP. EXPT. F | EXAMPLE 12 | COMP. EXPT. G |
|---|---|---|---|---|---|---|---|---|
| COPOLYMER SOLUTION, EX. NO./g | 5/30.0 | — | 6/30.0 | — | 7/30.0 | — | 8/30.0 | — |
| GCH 14, g | 7.48 | 7.48 | 6.57 | 6.57 | | | | |
| DGEBA SOLUTION, g | — | 30.0 | — | 30.0 | — | 30.0 | — | 30.0 |
| METHYL ETHER OF PROPYLENE GLYCOL, g | 5.0 | 5.0 | 5.0 | 5.0 | 5.0 | 5.0 | 5.0 | 5.0 |
| CURED FILM PROPERTIES | | | | | | | | |
| GLOSS | excellent | excellent | excellent | excellent | excellent | excellent | excellent | excellent |
| REVERSE IMPACT, | | | | | | | | |
| in-lbs | 3 | 130 | 120 | 110 | 140 | 140 | 130 | 140 |
| cm-kg | 3.5 | 150 | 138 | 127 | 161 | 161 | 150 | 161 |
| FORWARD IMPACT, | | | | | | | | |
| in-lbs | 18 | 180 | 180 | 180 | 180 | 180 | 180 | 180 |
| cm-kg | 20.7 | 207 | 207 | 207 | 207 | 207 | 207 | 207 |
| HARDNESS, pencil | 2H | 2H | 2H | 3H | F | 2H | F | 2H |
| ADHESION, % retained | 100 | 100 | 100 | 100 | 100 | 100 | 100 | 100 |
| MEK DOUBLE RUBS | >200 | >200 | >200 | >200 | >200 | >200 | >200 | >200 |
| DRY FILM THICKNESS, | | | | | | | | |
| mils | 2 | 1.5 | 2 | 1.5 | 2 | 1.5 | 1.5 | 1.5 |
| mm | 0.05 | 0.04 | 0.05 | 0.04 | 0.05 | 0.04 | 0.04 | 0.04 |
| GLOSS AFTER 1000 HRS (3.6 × 10$^6$ s) QUV exposure | fair | flat | fair | flat | good | flat | good | flat |

EXAMPLES 13–16

TABLE III

| | EXAMPLE 5 | EXAMPLE 6 | EXAMPLE 7 | EXAMPLE 8 |
|---|---|---|---|---|
| COMPONENTS | | | | |
| EPOXY RESIN[1], g/equiv. | 240/1.26 | 240/1.26 | 240/1.26 | 240/1.26 |
| METHACRYLIC ACID, g/equiv. | 21.7/.252 | 30.7/.357 | 37.6/.437 | 48.5/.564 |
| ACID/EPOXY EQUIV. RATIO | 0.2/1 | 0.283/1 | 0.346/1 | 0.4/1 |
| 1% PHENOTHIAZINE IN METHYL AMYL KETONE, g | 10 | 10 | 10 | 10 |
| ETHYLTRIPHENYLPHOSPHONIUM ACETATE.ACETIC ACID COMPLEX, g | 0.5 | 0.5 | 0.5 | 0.5 |
| SEC-BUTYL ACRYLATE, g | 133 | 133 | 133 | 133 |
| STYRENE, g | 84.8 | 84.8 | 84.8 | 84.8 |
| t-BUTYL PERBENZOATE, g/mole %[2] | 12.2/2.90 | 12.8/2.90 | 13.3/2.91 | 13.7/2.84 |
| METHYL AMYL KETONE, g | 200 | 204 | 207 | 213 |
| PROPERTIES | | | | |
| SOLUTION VISCOSITY, cps | 328 | 757 | 1870 | 3910 |
| % NON-VOLATILES | 68.8 | 69.1 | 69.1 | 69.2 |
| MOLECULAR WEIGHT OF THE COPOLYMER | | | | |
| $\overline{M}_w$ | 1.08 × 10$^4$ | 1.52 × 10$^4$ | 2.5 × 10$^4$ | 3.7 × 10$^4$ |
| $\overline{M}_n$ | 7.1 × 10$^3$ | 8.02 × 10$^3$ | 9.45 × 10$^3$ | 1.09 × 10$^4$ |
| ACRYLIC/EPOXY, wt. % | 50/50 | 51/49 | 52/48 | 52/48 |
| (f)$_n$ of acrylic copolymers | 3.2 | 4.0 | 5.4 | 4.9 |
| $(\overline{X})_n$ of acrylic copolymers | 0.4 | 0.8 | 1.3 | 0.6 |
| EEW (total solids basis) | 515 | 590 | 660 | 800 |

[1]The epoxy resin was a diglycidyl ether of bisphenol A having an average EEW of 190.
[2]a free-radical polymerization initiator; mol % is defined as follows:

$$\text{mol \% of initiator} = \frac{(\text{mols of initiator}) \cdot 100}{(\text{mols of vinyl monomers}) + (\text{mols of initiator})}$$

EXAMPLES 9–12 AND COMP. EXPT. D–G

The solution epoxy-containing polymers of Table III were made into clear, catalyzed epoxy coatings. The Employing the procedure for Example 1, various compositions were prepared. The components and results are given in Table V.

The purpose of this series of experiments was to demonstrate the preparation and use of a set of copolymer resins in which the molecular weight has been varied by When the t-butyl perbenzoate concentration was reduced to 0.50 mol %, the copolymer solution gelled during polymerization.

TABLE V

|  | EXAMPLE 13 | EXAMPLE 14 | EXAMPLE 15 | EXAMPLE 16 |
|---|---|---|---|---|
| COMPONENTS |  |  |  |  |
| EPOXY RESIN[1], g/equiv. | 452.5/2.5 | 452.5/2.5 | 452.5/2.5 | 452.5/2.5 |
| METHACRYLIC ACID, g/equiv. | 58/.674 | 58/.674 | 58/.674 | 58/.674 |
| ACID/EPOXY EQUIV. RATIO | .270 | .270 | .270 | .270 |
| 1% p-METHOXYPHENOL IN METHYL AMYL KETONE, g | 6.0 | 6.0 | 6.0 | 6.0 |
| ETHYLTRIPHENYLPHOSPHONIUM ACETATE.ACETIC ACID COMPLEX, g | 0.77 | 0.77 | 0.77 | 0.77 |
| n-BUTYL ACRYLATE, g | 167.5 | 167.5 | 167.5 | 167.5 |
| METHYL METHACRYLATE, g | 206.3 | 206.3 | 206.3 | 206.3 |
| t-BUTYL PERBENZOATE, g/mole %[2] | 7.8/0.95 | 15.6/1.95 | 23.4/2.88 | 31.2/3.85 |
| METHYL AMYL KETONE, g | 370 | 372 | 375 | 379 |
| PROPERTIES |  |  |  |  |
| SOLUTION VISCOSITY, cps | 1100 | 512 | 427 | 378 |
| % NON-VOLATILES | 68.7 | 68.3 | 68.8 | 68.8 |
| MOLECULAR WEIGHT OF THE COPOLYMER |  |  |  |  |
| $\overline{M_w}$ | $5.1 \times 10^4$ | $1.6 \times 10^4$ | $1.2 \times 10^4$ | $9.6 \times 10^3$ |
| $\overline{M_n}$ | $9.47 \times 10^3$ | $6.8 \times 10^3$ | $5.22 \times 10^3$ | $4.66 \times 10^3$ |
| ACRYLIC/EPOXY, wt. % | 49/51 | 50/50 | 50/50 | 50/50 |
| $(\bar{f}_n)$ of acrylic copolymers | 6.6 | 4.3 | 3.5 | 2.9 |
| $(X)_n$ of acrylic copolymers | 1.2 | 0.8 | 0.6 | 0.5 |
| EEW (total solids basis) | 497 | 504 | 509 | 523 |

[1]The epoxy resin was a diglycidyl ether of bisphenol A having an average EEW of 181.
[2]See Table III.

varying the initiator concentration while holding the number of branch sites constant. Higher initiator concentrations result in shorter copolymer chains, hence fewer branch sites per molecule.

Comparison of the data of Table V with those of Table III demonstrates that variation of initiator concentration is the more effective means of obtaining high levels of epoxy functionality in the vinyl copolymer ($\bar{f}_n$) without driving up viscosity excessively. Both methods, however, are practical and yield coatings having similar properties.

EXAMPLES 17–28 AND COMP. EXPT. H–J

The solution epoxy-containing polymers were made into clear catalyzed epoxy coatings. The components and results are given in Table VI. For comparative purposes, a similar coating was prepared from a diglycidyl ether of bisphenol A epoxy resin having a similar epoxide equivalent weight. This epoxy resin used for control purposes is designated as DGEBA. The compositions and results are given in Table VI.

The overall properties of these coatings are generally equal or superior to the control, with much better resistance to dulling by ultraviolet light.

TABLE VI

| COMPONENTS & PROPERTIES | EXAMPLE 17 | EXAMPLE 18 | EXAMPLE 19 | EXAMPLE 20 | COMP. EXPT. H |
|---|---|---|---|---|---|
| COPOLYMER SOLUTION, EX. NO./g | 13/21.0 | 14/21.0 | 15/21.0 | 16/21.0 | — |
| DGEBA SOLUTION, g | — | — | — | — | 21.0 |
| METHYL ETHER OF PROPYLENE GLYCOL, g | 5.0 | 5.0 | 5.0 | 5.0 | 5.0 |
| CURING AGENT, type | GCH14[1] | GCH14 | GCH14 | GCH14 | GCH14 |
| g | 5.0 | 5.0 | 5.0 | 5.0 | 5.0 |
| METHYL ETHYL KETONE |  |  |  |  |  |
| GLOSS | excellent | excellent | excellent | excellent | good |
| HARDNESS, pencil | 2H–3H | 2H | 2H | 2H | H–2H |
| ADHESION (DRY), % retention | 100 | 100 | 100 | 100 | 30 |
| REVERSE IMPACT, in-lbs | >180 | >180 | >180 | >180 | >180 |
| cm-kg | >207 | >207 | >207 | >207 | >207 |
| MEK DOUBLE RUBS | >200 | >200 | >200 | >200 | >200 |
| LOSS OF ADHESION AFTER IMMERSION FOR 1 HOUR (3600 s) IN BOILING WATER, % | 39 | 89 | 92 | 47 | 100 |
| SALT-FOG EXPOSURE FOR 24 HOURS (86400 s) | 0.75" (19.05 mm) creep | 0.75" (19.05 mm) creep | 0.75" (19.05 mm) creep | 0.75" (19.05 mm) creep | gross failure |
| EXPOSURE TO QUV FOR 500 HRS ($1.8 \times 10^6$ s) | low gloss | medium gloss | medium gloss | low gloss | flat |

| COMPONENTS & PROPERTIES | EXAMPLE 21 | EXAMPLE 22 | EXAMPLE 23 | EXAMPLE 24 | COMP. EXPT. I |
|---|---|---|---|---|---|
| COPOLYMER SOLUTION, EX. NO./g | 13/21.0 | 14/21.0 | 15/21.0 | 16/21.0 | — |
| DGEBA SOLUTION, g | — | — | — | — | 21.0 |
| METHYL ETHER OF PROPYLENE | 5.0 | 5.0 | 5.0 | 5.0 | 5.0 |

TABLE VI-continued

| | | | | | |
|---|---|---|---|---|---|
| GLYCOL, g | | | | | |
| CURING AGENT, type | V115X70[2] | V115X70 | V115X70 | V115X70 | V115X70 |
| g | 11.5 | 11.5 | 11.5 | 11.5 | 11.5 |
| METHYL ETHYL KETONE | | | | | |
| GLOSS | very good | very good | fair | good | very good |
| HARDNESS, pencil | F-H | 2H | 2H | F | 2H |
| ADHESION (DRY), % retention | 100 | 100 | 100 | 100 | 56 |
| REVERSE IMPACT, in-lbs | 50 | 70 | 60 | 70 | 180 |
| cm-kg | 58 | 81 | 69 | 87 | 207 |
| MEK DOUBLE RUBS | >200 | >200 | >200 | >200 | <125 |
| LOSS OF ADHESION AFTER IMMERSION For 1 HOUR (3600 s) IN BOILING WATER, % | <5 | 65 | <5 | 34 | 100 |
| SALT-FOG EXPOSURE FOR 24 HOURS (86400 s) | 0.5" (12.7 mm) creep | 0.5" (12.7 mm) creep | 0.5" (12.7 mm) creep | 0.5" (12.7 mm) creep | 0.5" (12.7 mm) creep |
| EXPOSURE TO QUV FOR 500 HRS ($1.8 \times 10^6$s) | low gloss | low gloss | low gloss | low gloss | flat |

| COMPONENTS & PROPERTIES | EXAMPLE 25 | EXAMPLE 26 | EXAMPLE 27 | EXAMPLE 28 | COMP. EXPT. J |
|---|---|---|---|---|---|
| COPOLYMER SOLUTION, EX. NO./g | 13/21.0 | 14/21.0 | 15/21.0 | 16/21.0 | — |
| DGEBA SOLUTION, g | — | — | — | — | 21.0 |
| METHYL ETHER OF PROPYLENE GLYCOL, g | 5.0 | 5.0 | 5.0 | 5.0 | 5.0 |
| CURING AGENT, type | D.E.H. 29[3] | D.E.H. 29 | D.E.H. 29 | D.E.H. 29 | D.E.H. 29 |
| g | 1.2 | 1.2 | 1.2 | 1.2 | 1.2 |
| METHYL ETHYL KETONE | | | | | |
| GLOSS | excellent | excellent | excellent | excellent | very good |
| HARDNESS, pencil | 2H-3H | H-2H | 2H-3H | H-2H | H-2H |
| ADHESION (DRY), % retention | 100 | 100 | 100 | 100 | 31 |
| REVERSE IMPACT, in-lbs | 40 | 70 | <20 | 30 | >180 |
| MEK DOUBLE RUBS | >200 | >200 | >200 | >200 | >200 |
| LOSS OF ADHESION AFTER IMMERSION FOR 1 HOUR (3600 s) IN BOILING WATER, % | 10 | 100 | 100 | 100 | 100 |
| SALT-FOG EXPOSURE FOR 24 HOURS (86400 s) | 1" (25.4 mm) creep | 1" (25.4 mm) creep | 1" (25.4 mm) creep | 1" (25.4 mm) creep | gross failure |
| EXPOSURE TO QUV FOR 500 HRS ($1.8 \times 10$ s) | low gloss | low gloss | very low gloss | low gloss | flat |

[1]Curing agent GCH14 was a polyamide having an amine hydrogen equivalent weight of about 175 available from General Mills as Versamid 114.
[2]Curing agent V115X70 was a polyamide having an amine hydrogen equivalent weight of about 375 available from General Mills as VERSAMIDE ® 115X70.
[3]D.E.H. ® 29 was a polyamine having an amine hydrogen equivalent weight of about 29 available from The Dow Chemical Company.

EXAMPLES 28–31

Employing the procedure for Example 1, various compositions were prepared. The components and characteristics are given in Table VII.

In this series of copolymers the molecular weight of the diglycidyl ether resin was increased until gellation of the copolymer solution occurred. The highest molecular-weight diglycidyl ether that could be used was about 760.

TABLE VII

| | EXAMPLE 28 | EXAMPLE 29 | EXAMPLE 30 | EXAMPLE 31 |
|---|---|---|---|---|
| COMPONENTS | | | | |
| EPOXY RESIN[1], g/equiv. | 425/2.35 | 498.1/2.25 | 548.9/1.95 | 610.6/1.60 |
| , EEW | 181 | 221 | 281 | 381 |
| METHACRYLIC ACID, g/equiv. | 58/.674 | 52.2/.607 | 45.2/.526 | 37.1/.431 |
| ACID/EPOXY EQUIV. RATIO | .287 | .270 | .270 | .269 |
| 1% P-METHOXYPHENOL IN METHYL AMYL KETONE, g | 6.0 | 6.5 | 7.0 | 7.6 |
| ETHYLTRIPHENYLPHOSPHONIUM ACETATE.ACETIC ACID COMPLEX, g | 0.77 | 0.84 | 0.89 | 1.00 |
| n-BUTYL ACRYLATE, g | 167.5 | 150.8 | 130.7 | 107.2 |
| METHYL METHACRYLATE, g | 206.3 | 183.4 | 158.9 | 130.4 |
| t-BUTYL PERBENZOATE, g/mole %[2] | 23.4/2.89 | 21.1/2.92 | 18.3/2.92 | 15/2.92 |
| METHYL AMYL KETONE, g | 375 | 376 | 377 | 370 |
| PROPERTIES | | | | |
| SOLUTION VISCOSITY, cps | 427 | 665 | 1100 | 3790 |
| % NON-VOLATILES | 68.8 | 68.5 | 68.2 | 68.0 |
| MOLECULAR WEIGHT OF THE COPOLYMER | | | | |
| $\overline{M}_w$ | $1.2 \times 10^4$ | $1 \times 10^4$ | $1.1 \times 10^4$ | $1.5 \times 10^4$ |
| $\overline{M}_n$ | $5.22 \times 10^3$ | $5.4 \times 10^3$ | $4.91 \times 10^3$ | $5.67 \times 10^3$ |
| ACRYLIC/EPOXY, wt. % | 50/50 | 45/55 | 39/61 | 32/68 |
| $(f)_n$ of acrylic copolymer | 3.5 | 3.6 | 2.5 | 3.0 |
| $(\overline{X})_n$ of acrylic copolymer | 0.6 | 0.7 | 0.5 | 0.6 |

TABLE VII-continued

|  | EXAMPLE 28 | EXAMPLE 29 | EXAMPLE 30 | EXAMPLE 31 |
|---|---|---|---|---|
| EEW (total solids basis) | 509 | 577 | 685 | 810 |

[2] See Table III.

EXAMPLES 32-43

Employing the procedure for Examples 2-4, coatings were prepared from the epoxy-containing polymers prepared in Examples 28-31. Methyl ethyl ketone was added to each formulation in a quantity sufficient to provide the coating with a viscosity of 125-140 cps. The formulation and results are given in Table VIII.

It is noteworthy that when the EEW of the copolymer resin (total resin solids) passes from 685 to 810 a sharp deterioration in several properties is observed; viz., gloss retention, solvent resistance, and salt-fog resistance. An EEW less than about 700, and preferably less than about 600, is therefore desirable.

TABLE VIII

| COMPONENTS & PROPERTIES | EXAMPLE 32 | EXAMPLE 33 | EXAMPLE 34 | EXAMPLE 35 |
|---|---|---|---|---|
| COPOLYMER SOLUTION, EX. NO./g | 9/20.7 | 10/23.5 | 11/27.9 | 12/33 |
| METHYL ETHER OF PROPYLENE GLYCOL, g | 5.0 | 5.0 | 5.0 | 5.0 |
| CURING AGENT, type | GCH14[1] | GCH14 | GCH14 | GCH14 |
| g | 5.0 | 5.0 | 5.0 | 5.0 |
| GLOSS | excellent | excellent | excellent | excellent |
| HARDNESS, pencil | 2H | 2H | 2H-3H | 2H |
| ADHESION (DRY), % retention | 100 | 100 | 100 | 100 |
| REVERSE IMPACT, in-lbs | 150 | >180 | >180 | >180 |
| cm-kg | 173 | >207 | >207 | >207 |
| MEK DOUBLE RUBS | >200 | >200 | >200 | 100 |
| LOSS OF ADHESION AFTER IMMERSION FOR 1 HOUR (3600 s) IN BOILING WATER, % | 92 | 100 | 100 | 100 |
| SALT-FOG EXPOSURE FOR 24 HOURS (86400 s) | 0.75" (19.05 mm) creep | 0.5" (12.7 mm) creep | 1" (25.4 mm) creep | 1" (25.4 mm) creep |
| EXPOSURE TO QUV FOR 500 HRS (1.8 × 10[6]s) | fair gloss | fair gloss | fair gloss | low gloss |

| COMPONENTS & PROPERTIES | EXAMPLE 36 | EXAMPLE 37 | EXAMPLE 38 | EXAMPLE 39 |
|---|---|---|---|---|
| COPOLYMER SOLUTION, EX. NO./g | 9/20.7 | 10/23.5 | 11/27.9 | 12/33.0 |
| METHYL ETHER OF PROPYLENE GLYCOL, g | 5.0 | 5.0 | 5.0 | 5.0 |
| CURING AGENT, type | V115X70[2] | V115X70 | V115X70 | V115X70 |
| g | 11.5 | 11.5 | 11.5 | 11.5 |
| GLOSS | fair | excellent | excellent | excellent |
| HARDNESS, pencil | 2H | H | H | H |
| ADHESION (DRY), % retention | 100 | 100 | 100 | 100 |
| REVERSE IMPACT, in-lbs | 60 | >180 | >180 | >180 |
| cm-kg | 69 | >207 | >207 | >207 |
| MEK DOUBLE RUBS | >200 | >200 | 200 | 100 |
| LOSS OF ADHESION AFTER IMMERSION FOR 1 HOUR (3600 s) IN BOILING WATER, % | <5 | 10 | <5 | 97 |
| SALT-FOG EXPOSURE FOR 24 HOURS (86400 s) | 0.5" (12.7 mm) creep | 0.5" (12.7 mm) creep | 0.75" (19.05 mm) creep | 1" (25.4 mm) creep |
| EXPOSURE TO QUV FOR 500 HRS (1.8 × 10[6]s) | low gloss | fair gloss | low gloss | good gloss |

| COMPONENTS & PROPERTIES | EXAMPLE 40 | EXAMPLE 41 | EXAMPLE 42 | EXAMPLE 43 |
|---|---|---|---|---|
| COPOLYMER SOLUTION, EX. NO./g | 9/20.7 | 10/23.5 | 11/27.9 | 12/33.0 |
| METHYL ETHER OF PROPYLENE GLYCOL, g | 5.0 | 5.0 | 5.0 | 5.0 |
| CURING AGENT, type | D.E.H. ® 29[3] | D.E.H. ® 29 | D.E.H. ® 29 | D.E.H. ® 29 |
| g | 1.2 | 1.2 | 1.2 | 1.2 |
| GLOSS | excellent | excellent | excellent | excellent |
| HARDNESS, pencil | 2H-3H | 3H | 2H-3H | 2H |
| ADHESION (DRY), % retention | 100 | 100 | 100 | 100 |
| REVERSE IMPACT, in-lbs | <20 | 110 | 130 | >180 |
| cm-kg | <23 | 127 | 150 | >207 |
| MEK DOUBLE RUBS | >200 | >200 | 190 | 175 |
| LOSS OF ADHESION AFTER IMMERSION FOR 1 HOUR (3600 s) IN BOILING WATER, % | 100 | 100 | 100 | 100 |
| SALT-FOG EXPOSURE FOR 24 HOURS (86400 s) | 1" (25.4 mm) creep | 1" (25.4 mm) creep | 1" (25.4 mm) creep | gross failure |

TABLE VIII-continued

| EXPOSURE TO QUV FOR 500 HRS | low | fair | good | low |
|---|---|---|---|---|
| $(1.8 \times 10^6 s)$ | gloss | gloss | gloss | gloss |

[1] Curing agent GCH14 was a polyamide having an amine hydrogen equivalent weight of about 175 available from General Mills as Versamid 140.
[2] Curing agent V115X70 was a polyamide having an amine hydrogen equivalent weight of about 375 available from General Mills as VERSAMIDE ® 115X70.
[3] D.E.H. ® 29 was a polyamine having an amine hydrogen equivalent weight of about 29 available from The Dow Chemical Company.

EXAMPLES 44–48

Employing the procedure of Example 1, various compositions were prepared. The components and characteristics are given in Table IX.

The purpose of this series of copolymers was the demonstration of film improvements by incorporation of an hydroxyl-functional vinyl monomer into the copolymer.

In this series progressively larger amounts of 2-hydroxypropyl acrylate were substituted for n-butyl acrylate in the vinyl monomer recipe to improve copolymer resin/hardener compatibility. The results are improved dry-film clarity and gloss and reduced surface oiliness, if the 2-hydroxypropyl acrylate weight concentration in the vinyl monomers recipe exceeds about ten percent.

Methyl ethyl ketone was added to each formulation in a quantity sufficient to provide the coating with a viscosity of 125–140 cps. The results are given in Table X.

TABLE IX

|  | EXAMPLE 44 | EXAMPLE 45 | EXAMPLE 46 | EXAMPLE 47 | EXAMPLE 48 |
|---|---|---|---|---|---|
| COMPONENTS | | | | | |
| EPOXY RESIN[1], g/equiv. | 1200/6.63 | 400/2.21 | 400/2.21 | 400/2.21 | 400/2.21 |
| METHACRYLIC ACID, g/equiv. | 153.5/1.78 | 51.2/.60 | 51.2/.60 | 51.2/.60 | 51.2/.60 |
| ACID/EPOXY EQUIV. RATIO | .269 | .269 | .269 | .269 | .269 |
| 1% PHENOTHIAZINE IN METHYL AMYL KETONE, g | 28.1 | 9.4 | 9.4 | 9.4 | 9.4 |
| ETHYLTRIPHENYLPHOSPHONIUM ACETATE.ACETIC ACID COMPLEX, g | 2.5 | 0.83 | 0.83 | 0.83 | 0.83 |
| n-BUTYL ACRYLATE, g | 493 | 154 | 144 | 123 | 82 |
| STYRENE, g | 597 | 199 | 199 | 199 | 199 |
| 2-HYDROXYPROPYL ACRYLATE, g | 0 | 10.3 | 20.6 | 41.2 | 82.4 |
| t-BUTYL PERBENZOATE, g/mole %[2] | 65.9/2.88 | 22.0/2.89 | 22.0/2.89 | 22.0/2.90 | 22.0/2.91 |
| METHYL AMYL KETONE, g | 1040 | 343 | 343 | 343 | 343 |
| PROPERTIES | | | | | |
| SOLUTION VISCOSITY, cps | 822 | 1130 | 1180 | 1410 | 2030 |
| % NON-VOLATILES | 70.5 | 70 | 70 | 70 | 70 |
| MOLECULAR WEIGHT OF THE COPOLYMER | | | | | |
| $\bar{M}_w$ | $1.2 \times 10^4$ | $2.2 \times 10^4$ | $1.9 \times 10^4$ | $2.3 \times 10^4$ | $2.1 \times 10^4$ |
| $\bar{M}_n$ | $7.15 \times 10^3$ | $8.78 \times 10^3$ | $8.49 \times 10^3$ | $8.53 \times 10^3$ | $8.79 \times 10^3$ |
| ACRYLIC/EPOXY, wt. % | 52/48 | 52/48 | 52/48 | 52/48 | 52/48 |
| $(f)_n$ of acrylic copolymer | 3.4 | 4.2 | 4.2 | 4.2 | 4.2 |
| $(X)_n$ of acrylic copolymer | 0.7 | 0.8 | 0.8 | 0.8 | 0.8 |
| EEW (total solids basis) | 560 | 568 | 565 | 560 | 575 |

[1] The epoxy resin was a diglycidyl ether of bisphenol A having an average EEW of 181.
[2] See Table III.

EXAMPLES 49–63

Employing the procedure of Examples 2–4, coatings were prepared from the epoxy-containing polymers

TABLE X

| COMPONENTS & PROPERTIES | EXAMPLE 49 | EXAMPLE 50 | EXAMPLE 51 | EXAMPLE 52 | EXAMPLE 53 |
|---|---|---|---|---|---|
| COPOLYMER SOLUTION, EX. NO./g | 44/21.0 | 45/21.0 | 46/21.0 | 47/21.0 | 48/21.0 |
| METHYL ETHER OF PROPYLENE GLYCOL, g | 5.0 | 5.0 | 5.0 | 5.0 | 5.0 |
| CURING AGENT, type | GCH14[1] | GCH14 | GCH14 | GCH14 | GCH14 |
| g | 5.0 | 5.0 | 5.0 | 5.0 | 5.0 |
| GLOSS | good | excellent | excellent | excellent | excellent |
| HARDNESS, pencil | H | H | H | 2H | H |
| ADHESION (DRY), % retention | 100 | 100 | 100 | 100 | 100 |
| REVERSE IMPACT, in-lbs | 180 | >180 | 180 | 180 | 180 |
| cm-kg | 207 | >207 | 207 | 207 | 207 |
| MEK DOUBLE RUBS | >200 | >200 | >200 | >200 | >200 |
| LOSS OF ADHESION AFTER IMMERSION FOR 1 HOUR (3600 s) IN BOILING WATER, % | 61 | 86 | 86 | 96 | 44 |
| SALT-FOG EXPOSURE FOR 24 HOURS 0.75" (86400 s) | 0.75" (19.05 mm) creep | 0.75" (19.05 mm) creep | 0.75" (19.05 mm) creep | 0.5" (12.7 mm) creep | 0.75" (19.05 mm) creep |
| EXPOSURE TO QUV FOR 500 HRS $(1.8 \times 10^6 s)$ | medium gloss | medium gloss | medium gloss | low gloss | medium gloss |
| FILM CLARITY | clear | clear | clear | clear | clear |
| FILM SURFACE OILINESS | oily | slightly oily | none | none | none |

TABLE X-continued

| COMPONENTS & PROPERTIES | EXAMPLE 54 | EXAMPLE 55 | EXAMPLE 56 | EXAMPLE 57 | EXAMPLE 58 |
|---|---|---|---|---|---|
| COPOLYMER SOLUTION, EX. NO./g | 44/21.0 | 45/21.0 | 46/21.0 | 47/21.0 | 48/21.0 |
| METHYL ETHER OF PROPYLENE GLYCOL, g | 5.0 | 5.0 | 5.0 | 5.0 | 5.0 |
| CURING AGENT, type | V115X70[2] | V115X70 | V115X70 | V115X70 | V115X70 |
| g | 11.5 | 11.5 | 11.5 | 11.5 | 11.5 |
| GLOSS | excellent | excellent | excellent | excellent | excellent |
| HARDNESS, pencil | H | F-H | 2H | F | H-2H |
| ADHESION (DRY), % retention | 100 | 100 | 100 | 100 | 100 |
| REVERSE IMPACT, in-lbs | 30 | 50 | 80 | 110 | 120 |
| cm-kg | 35 | 58 | 92 | 127 | 138 |
| MEK DOUBLE RUBS | 100 | >200 | 100 | 100 | 150 |
| LOSS OF ADHESION AFTER IMMERSION FOR 1 HOUR (3600 s) IN BOILING WATER, % | 10 | <5 | 32 | 32 | 55 |
| SALT-FOG EXPOSURE FOR 24 HOURS (86400 s) | 1" (25.4 mm) creep | 0.5" (12.7 mm) creep | gross failure | 0.75" (19.05 mm) creep | 0.5" (12.7 mm) creep |
| EXPOSURE TO QUV FOR 500 HRS ($1.8 \times 10^6$ s) | low gloss | low gloss | lost | low gloss | medium gloss |
| FILM CLARITY | cloudy | clear | clear | clear | clear |
| FILM SURFACE OILINESS | oily | slightly oily | none | none | none |

| EXAMPLE COMPONENTS & PROPERTIES | EXAMPLE 59 | EXAMPLE 60 | EXAMPLE 61 | EXAMPLE 62 | EXAMPLE 63 |
|---|---|---|---|---|---|
| COPOLYMER SOLUTION, EX. NO./g | 44/21.0 | 45/21.0 | 46/21.0 | 47/21.0 | 48/21.0 |
| METHYL ETHER OF PROPYLENE GLYCOL, g | 5.0 | 5.0 | 5.0 | 5.0 | 5.0 |
| CURING AGENT, type | D.E.H. ® 29[3] | D.E.H. ® 29 | D.E.H. ® 29 | D.E.H. ® 29 | D.E.H. ® 29 |
| g | 1.2 | 1.2 | 1.2 | 1.2 | 1.2 |
| GLOSS | good | good | excellent | excellent | excellent |
| HARDNESS, pencil | H-2H | H-2H | 2H | 2H | 2H |
| ADHESION (DRY), % retention | 100 | 100 | 100 | 100 | 100 |
| REVERSE IMPACT, in-lbs | <20 | <20 | <20 | <20 | <20 |
| cm-kg | <23 | <23 | <23 | <23 | <23 |
| MEK DOUBLE RUBS | >200 | >200 | >200 | >200 | >200 |
| LOSS OF ADHESION AFTER IMMERSION FOR 1 HOUR (3600 s) IN BOILING WATER, % | 100 | 100 | 100 | 100 | 100 |
| SALT-FOG EXPOSURE FOR 24 HOURS (86400 s) | 1" (25.4 mm) creep | 1" (25.4 mm) creep | 1" (25.4 mm) creep | gross failure | gross failure |
| EXPOSURE TO QUV FOR 500 HRS ($1.8 \times 10^6$ s) | medium gloss | medium gloss | medium gloss | medium gloss | medium-good gloss |
| FILM CLARITY | faint haze | clear | clear | clear | clear |
| FILM SURFACE OILINESS | oily | oily | faint | none | none |

[1] Curing agent GCH14 was a polyamide having an amine hydrogen equivalent weight of about 175 available from General Mills as Versamid 140.
[2] Curing agent V115X70 was a polyamide having an amine hydrogen equivalent weight of about 375 available from General Mills as VERSAMIDE ® 115X70.
[3] D.E.H. ® 29 was a polyamide having an amine hydrogen equivalent weight of about 29 available from The Dow Chemical Company.

EXAMPLES 64–66 AND COMP. EXPT. J

The procedure of Example 1 was employed in preparing the epoxy-containing polymers except that the polymerization temperature was varied. The components and results are given in Table XI.

Higher temperatures are seen to yield copolymers of narrower molecular weight distribution ($\overline{M}_w/\overline{M}_n$), a desirable property. A temperature of about 135° C. is the lowest practical.

TABLE XI

| | EXAMPLE 64 | EXAMPLE 65 | EXAMPLE 66 | COMP. EXPT. J |
|---|---|---|---|---|
| COMPONENTS | | | | |
| EPOXY RESIN[1], g/equiv. | 485.7/2.68 | 485.7/2.68 | 485.7/2.68 | 485.7/2.68 |
| METHACRYLIC ACID, g/equiv. | 80/.93 | 80/.93 | 80/.93 | 80/.93 |
| ACID/EPOXY EQUIV. RATIO | .347 | .347 | .347 | .347 |
| 1% p-METHOXYPHENOL IN METHYL AMYL KETONE, g | 6.6 | 6.6 | 6.6 | 6.6 |
| ETHYLTRIPHENYLPHOSPHONIUM ACETATE ·ACETIC ACID COMPLEX, g | 0.85 | 0.85 | 0.85 | 0.85 |
| n-BUTYL ACRYLATE, g | 188 | 188 | 188 | 188 |
| METHYL METHACRYLATE, g | 217.7 | 217.7 | 217.7 | 217.7 |
| t-BUTYL PERBENZOATE, g/mole %[2] | 14.0/3.15 | 14.0/3.15 | 14.0/3.15 | 14.0/3.15 |
| METHYL AMYL KETONE, g | 342 | 342 | 342 | 342 |
| POLYMERIZATION TEMPERATURE, °C. | 148 | 143 | 138 | 133 |

TABLE XI-continued

|  | EXAMPLE 64 | EXAMPLE 65 | EXAMPLE 66 | COMP. EXPT. J |
|---|---|---|---|---|
| PROPERTIES |  |  |  |  |
| SOLUTION VISCOSITY, cps | 2110 | 4370 | 20900 | gelled |
| % NON-VOLATILES | 70 | 70 | 70 | — |
| MOLECULAR WEIGHT OF THE COPOLYMER |  |  |  |  |
| $\overline{M}_w$ | $5.0 \times 10^4$ | $1.3 \times 10^5$ | $3.0 \times 10^5$ | — |
| $\overline{M}_n$ | $7.42 \times 10^3$ | $8.87 \times 10^3$ | $8.82 \times 10^3$ | — |
| ACRYLIC/EPOXY, wt. % | 51/49 | 51/49 | 51/49 | — |
| $\bar{f}_n$ of acrylic copolymer | 4.9 | 5.9 | 5.9 | — |
| $\overline{X}_n$ of acrylic copolymer | 1.3 | 1.6 | 1.6 | — |
| EEW (total solids basis) | 592 | 595 | 587 | — |

[1]The epoxy resin was a diglycidyl ether of bisphenol A having an average EEW of 181.
[2]See Table III.

EXAMPLE 67

The epoxy-methacrylic acid reaction was conducted as in Example 1. Then, this was mixed with the monomers and the mixture was fed over a period of 4 hours and 10 minutes (15000 s) at a solvent temperature of 120° C. The mixture was then stirred at 120° C. for an additional two hours (7200 s) to complete the polymerization. The composition and properties are given in the following Table XII.

This copolymer was prepared to illustrate the incorporation of additional epoxy functionality into the copolymer (the use of glycidyl methacrylate) and the use of a different solvent and a different polymerization initiator.

TABLE XII

|  | EXAMPLE 67 |
|---|---|
| COMPONENTS |  |
| EPOXY RESIN[1], g/equiv. | 240/1.326 |
| METHACRYLIC ACID, g/equiv. | 30.7/.357 |
| ACID/EPOXY EQUIV. RATIO | .269 |
| 1% p-METHOXYPHENOL IN METHYL AMYL KETONE, g | 7.2 |
| ETHYLTRIPHENYLPHOSPHONIUM ACETATE-ACETIC ACID COMPLEX, g | 0.50 |
| n-BUTYL ACRYLATE, g | 137.3 |
| GLYCIDYL METHACRYLATE, g | 72.0 |
| n-DODECANE-1-THIOL | 1.2 |
| 1-TERT-BUTYLAZO-1-CYANOCYCLOHEXANE g/mole %[2] | 14.9/2.85 |
| METHYL ETHER OF PROPYLENE GLYCOL | 284 |
| PROPERTIES |  |
| SOLUTION VISCOSITY, cps | not determined |
| % NON-VOLATILES | 62 |
| MOLECULAR WEIGHT OF THE COPOLYMER |  |
| $\overline{M}_w$ | $1.10 \times 10^4$ |
| $\overline{M}_n$ | $5.14 \times 10^3$ |
| ACRYLIC/EPOXY, wt. % |  |
| $\bar{f}_n$ of acrylic copolymer | 3.7 |
| $\overline{X}_n$ of acrylic copolymer | 0.7 |
| EEW (total solids basis) | 359 |

[1]The epoxy resin was a diglycidyl ether of bisphenol A having an average EEW of 181.
[2]See Table III.

EXAMPLES 68-69

The procedure of Example 1 was employed using various epoxy resins. The components and results are given in the following Table XIII.

Both resins gave good coatings when cured with a polyamide.

TABLE XIII

|  | EXAMPLE 68 | EXAMPLE 69 |
|---|---|---|
| COMPONENTS |  |  |
| EPOXY RESIN[1], g/equiv. | 237[1]/1.43 | 511.3[2]/2.86 |
| METHACRYLIC ACID, g/equiv. | 24.6/.286 | 49.2/.572 |
| ACID/EPOXY EQUIV. RATIO | .200 | .200 |
| 1% PHENOTHIAZINE IN METHYL AMYL KETONE, g | 10.0 | — |
| 1% HYDROQUINONE IN METHYL AMYL KETONE, g | — | 40.0 |
| ETHYLTRIPHENYLPHOSPHONIUM ACETATE-ACETIC ACID COMPLEX, g | 0.50 | 1.37 |
| SEC-BUTYL ACRYLATE, g | 133 | — |
| n-BUTYL ACRYLATE, g | — | 270.5 |
| STYRENE, g | 84.8 | — |
| METHYL METHACRYLATE, g | — | 191.6 |
| t-BUTYL PERBENZOATE, g/mole %[2] | 12.4/2.90 | 27.4/2.98 |
| METHYL AMYL KETONE, g | 200 | 411 |
| PROPERTIES |  |  |
| SOLUTION VISCOSITY, cps | 2790 | 2430 |
| % NON-VOLATILES | 68.7 | 69 |
| MOLECULAR WEIGHT OF THE COPOLYMER |  |  |
| $\overline{M}_w$ | $1.16 \times 10^4$ | $2.9 \times 10^4$ |
| $\overline{M}_n$ | $8.17 \times 10^3$ | $6.06 \times 10^3$ |
| ACRYLIC/EPOXY, wt. % |  |  |

TABLE XIII-continued

|  | EXAMPLE 68 | EXAMPLE 69 |
|---|---|---|
| $(f)_n$ of acrylic copolymer | 9.0 | ~8 |
| $(X)_n$ of acrylic copolymer | 2.4 | ~2 |
| EEW (total solids basis) | not det. | not det. |

[1] The epoxy resin was the triglycidyl ether of tris(4-hydroxyphenyl)methane having an average EEW of 166.
[2] The epoxy resin was the glycidyl ether of a phenol-formaldehyde novolac resin having an average epoxy functionality of about 3.5 and an average EEW of about 179.

EXAMPLE 70

A copolymer was prepared exactly as in Example 47, Table IX, except that, instead of 41.2 gm of 2-hydroxypropyl acrylate, 45.6 gm of 2-hydroxybutyl acrylate was used as part of the vinyl monomer mixture. The resulting copolymer solution had the following properties.

| Solution viscosity, cps | 779 |
|---|---|
| % Non-volatiles | 68 |
| Mol. Wt. of the Copolymer |  |
| $M_w$ | $1.74 \times 10^4$ |
| $M_n$ | $7.15 \times 10^3$ |
| Acrylic/Epoxy, wt. % | 52/48 |
| $(f)_n$ of acrylic copolymer | 3.5 |
| $(x)_n$ of acrylic copolymer | 0.8 |
| EEW (total solids basis) | 576 |

The copolymers of Examples 47 and 70 were made into white enamels for use with polyamide curing agents as shown below. Also included was a conventional bisphenol A diglycidyl ether known as DER®671, for comparative purposes.

| ENAMEL RECIPE | Resins of This Invention[1] | Conventional Epoxy Resin[2] |
|---|---|---|
| Pigment Grind |  |  |
| Epoxy Resin Solution | 180.0 gm | 168.0 gm |
| TiPure ® R-960 TiO$_2$ | 172.8 gm | 172.8 gm |
| Diluent |  |  |
| methyl ethyl ketone | sufficient to reduce the viscosity of the enamels to 300 cps. | |

[1] at 70% solids
[2] at 75% solids in methyl i-butyl ketone

The pigment was dispersed in the epoxy resin solution by grinding the mixture for ten minutes (600 s) on a Cowles high-shear disperser.

To each enamel was added a solution of 18.0 gm of Versamid®1540 in 22.0 gm of Dowanol®PM glycol ether solvent. After thorough mixing, the enamels were allowed to stand for 1.0 hours (3600 s) at 25° C., then sprayed onto 24 gauge unpolished cold-rolled steel, 24 gauge phosphatized steel (Bonderite®40), and aluminum Q panels. The coatings were allowed to harden for one week at 25° C. The enamels were designated as follows:

Enamel based on 2-hydroxypropyl acrylate—I-A
Enamel based on 2-hydroxybutyl acrylate—I-B
Enamel based on conventional epoxy resin—I-C In the same way, two more enamels were made for use with a different polyamide hardener, Versamid®115. In this case, only the experimental copolymer based on 2-hydroxypropyl acrylate was used.

| ENAMEL RECIPE | Resins of This Invention | Conventional Epoxy Resin |
|---|---|---|
| Pigment Grind |  |  |
| Epoxy Resin Solution | 170.0 gm | 158.7 gm |
| TiPure ® R-960 TiO$_2$ | 214.0 gm | 214.0 gm |
| Diluent |  |  |
| methyl ethyl ketone | sufficient to reduce the viscosity of the enamels to 300 cps. | |

To each of these enamels was added a solution of 59.5 gm of Versamid®115 dissolved in 50.0 gm of Dowanol®PM glycol ether and 26.9 gm of methyl ethyl ketone, with aging and spraying as before. Enamel designations were as follows.

Enamel based on 2-hydroxypropyl acrylate—IA
Enamel based on conventional epoxy resin—IIC The five enamels at spraying had the properties shown in Table XIV.

TABLE XIV

| Enamel Property | Value Property in Enamel | | | | |
|---|---|---|---|---|---|
|  | IA | IB | IC | IIA | IIC |
| color | white | white | white | white | white |
| viscosity, cps | ~300 | ~300 | ~300 | ~300 | ~300 |
| % non-volatiles | 72 | 71 | 66 | 65 | 67 |
| pigment/binder | 1.20 | 1.20 | 1.20 | 1.20 | 1.20 |
| resin/hardener | 7.0 | 7.0 | 7.0 | 2.0 | 2.0 |

After curing for one week at 25° C., the coated panels were evaluated as shown in Tables XV, XVI and XVII.

TABLE XV

Cured Coating Properties Over 24-Guage Unpolished Cold-Rolled Steel

| Coating Property | Value Obtained with Enamel | | | | |
|---|---|---|---|---|---|
|  | IA | IB | IC | IIA | IIC |
| 60° Gloss, % | 95 | 99 | 93 | 79 | 95 |
| SURFACE OILINESS | none | none | none | none | none |
| IMPACT, FORWARD[1] | 15 | 15 | 28 | 40 | 90 |
| IMPACT, REVERSE[1] | <2 | <2 | <2 | <20 | 30 |
| ADHESION, %[2] | 100 | 97 | 99 | 99 | 95 |
| MEK DOUBLE-RUBS[3] | 200 | 135 | >200 | >200 | >200 |
| ⅛ in. (3.175 mm) conical | ¼" | ⅛" | ⅛" | <1/16" | <1/16" |

TABLE XV-continued

Cured Coating Properties Over 24-Guage Unpolished Cold-Rolled Steel

| Coating Property | Value Obtained with Enamel | | | | |
|---|---|---|---|---|---|
| | IA | IB | IC | IIA | IIC |
| mandrel bend[4] | (6.35 mm) | (3.175 mm) | (3.175 mm) | (1.5875 mm) | (1.5875 mm) |
| DRY-FILM THICKNESS, | | | | | |
| mils | 2-2½ | 3-3½ | 3-3½ | 2½-3 | 2 |
| mm | 0.0508–0.0635 | 0.0762–0.0889 | 0.0762–0.0889 | 0.0635–0.0762 | 0.0508 |

[1]Gardner impactor, inch-lbs.
[2]1.5 mil (0.0381 mm) cross-hatch with tape-pull
[3]to substrate
[4]length of crack at narrow end of bend

TABLE XVI

CURED COATING CORROSION-RESISTANCE[1] OVER 24-GUAGE BONDERITE ® 40

| Coating Property | Value Obtained with Enamel | | | | |
|---|---|---|---|---|---|
| | IA | IB | IC | IIA | IIB |
| creep from scribe[2] | | | | | |
| 3 days (259200 s) | <1/32" | <1/32" | <1/32" | <1/32" | <1/32" |
| 7 days (604800 s) | 1/32" | 1/32" | 1/32" | 1/32" | 1/32" |
| 21 days (1814400 s) | ¼-⅜" | 3/32" | ½" | ¼" | ¼" |
| 42 days (3628800 s) | ¼-⅜" | ⅛" | >1" | ¾" | ⅛" |
| field rusting | | | | | |
| 3 days (259200 s) | none | none | slight | none | none |
| 7 days (604800 s) | none | none | severe | none | none |
| 21 days (1814400 s) | none | none | severe | none | none |
| 42 days (3628800 s) | none | none | severe | none | none |
| blisters | | | | | |
| 3 days (259200 s) | none | none | many fine | none | none |
| 7 days (604800 s) | none | none | many fine | none | none |
| 21 days (1814400 s) | none | none | many fine | few medium | none |
| 42 days (3628800 s) | few small | none | many medium | few medium | few small |

[1]5% salt-fog at 95° F. for 1000 hours
[2]1/32" = 0.79375 mm; ¼" = 6.35 mm; ¾" = 19.05 mm; 1/16" = 1.5875 mm
⅜" = 9.525 mm; 1" = 25.4 mm; ⅛" = 3.175 mm; ½" = 12.7 mm

TABLE XVII

Cured Coating Resistance to Dulling and Chalking in the QUV[1] ® Over Aluminum Q-Panels

| Property | Value Obtained with Enamel | | | | |
|---|---|---|---|---|---|
| | IA | IB | IC | IIA | IIB |
| 60° GLOSS AFTER | | | | | |
| 0 days | 95 | 98 | 94 | 80 | 97 |
| 3 days (259200 s) | 75 | 86 | 29 | 58 | 67 |
| 7 days (604800 s) | 41 | 78 | 7 | 20 | 19 |
| 14 days (1209600 s) | 15 | 30 | 6* | 8 | 12* |
| 21 days (1814400 s) | 31 | 24* | 5 | 5 | 7 |
| 28 days (2419200 s) | 12* | 21 | 3 | 5* | 5 |
| 35 days (3024000 s) | 11 | 19 | 3 | 7 | — |
| 42 days (3628800 s) | — | 15 | — | 6 | — |

*onset of chalking
[1]light/moisture cycle was 8.0 hours of light at 140° F. (60° C.) and 4.0 hours of moisture at 125° F. (51.7° C.).

EXAMPLE 71

A copolymer was prepared exactly as in Example 47, Table IX, except that 41.2 gm of 2-hydroxyethyl methacrylate was used in place of 41.2 gm of 2-hydroxypropyl acrylate. The resulting copolymer solution had the following properties.

| | |
|---|---|
| solution viscosity, cps | 1500 |
| % non-volatiles | 69.7 |
| mol. wt. of the copolymer | |
| $M_w$ | 20,000 |
| $M_n$ | 7,300 |
| acrylic/epoxy, wt. % | 52/48 |
| $(f)_n$ of acrylic polymer | 3.7 |
| $(X)_n$ of acrylic polymer | 0.9 |
| EEW (total solids basis) | 562 |

The resin was made into an enamel for use with Versamid ®1540 and sprayed on metal panels as in Example 70. Cured coating properties are shown below in Tables XVII–XIX. The experimental enamel is designated as III-B and DER ®671 control enamel as III-C.

TABLE XVIII

Cured Coating Properties Over 24-Guage Unpolished Cold-Rolled Steel

| Coating Property | III-B | III-C |
|---|---|---|
| 60° GLOSS, % | 89 | 93 |
| SURFACE OILINESS | none | none |
| IMPACT, FORWARD | 15 | 28 |
| IMPACT, REVERSE | <2 | <2 |
| ADHESION, % | 99 | 99 |
| MEK DOUBLE-RUBS | >200 | >200 |
| ⅛" (3.175 mm) | ½" (12.7 mm) | <1/16" |
| MANDREL BEND | crack | (1.5875 mm) crack |
| DRY FILM THICKNESS, | | |
| mils | 3-3½ | 3-3½ |
| mm | 0.0762–0.0889 | 0.0762–0.0889 |

TABLE XIX

Cured Coating Corrosion-Resistance Over 24-Guage Bonderite ® 40

| Coating Property | Value Obtained with Enamel | |
|---|---|---|
| | III-B | III-C |
| creep from scribe | | |
| 3 days (259200 s) | <1/32" (0.79375 mm) | <1/32" (0.79375 mm) |
| 7 days (604800 s) | <1/32" (0.79375 mm) | 1/32" (0.79375 mm) |
| 21 days (1814400 s) | 0-¼" (0-6.35 mm) | ½" (12.7 mm) |
| 42 days (3628800 s) | ¼-⅜" (6.35–9.525 mm) | >1" (25.4 mm) |
| field rusting | | |
| 3 days (259200 s) | none | slight |
| 7 days (604800 s) | none | severe |
| 21 days (1814400 s) | none | severe |
| 42 days (3628800 s) | none | severe |
| blisters | | |
| 3 days (259200 s) | none | many fine |
| 7 days (604800 s) | none | many fine |

TABLE XIX-continued

Cured Coating Corrosion-Resistance Over 24-Guage Bonderite ® 40

| Coating Property | Value Obtained with Enamel III-B | III-C |
|---|---|---|
| 21 days (1814400 s) | none | many fine |
| 42 days (3628800 s) | none | many medium |

TABLE XX

Cured Coating Resistance to Dulling and Chalking in the QUV ® Over Aluminum Q Panels

| Property | Value Obtained with Enamel III-B | III-C |
|---|---|---|
| 60° gloss after | | |
| 0 days | 92 | 94 |
| 3 days (259200 s) | 61 | 29 |
| 7 days (6048800 s) | 29 | 7 |
| 14 days (1209600 s) | 12 | 6* |
| 21 days (1814400 s) | 11 | 5 |
| 28 days (2419200 s) | 9* | 3 |
| 35 days (3024000 s) | 8 | 3 |
| 42 days (3628800 s) | — | — |

*onset of chalking

EXAMPLE 72

A copolymer was prepared exactly as in Example 47, Table IX, except that the methacrylic acid was first copolymerized with the other vinyl monomers, then this carboxylated copolymer solution was coupled to the bisphenol A diglycidyl ether resin. A comparison of the properties of the two products is given in Table XXI.

TABLE XXI

Comparison of Two Identical Copolymers Made by Different Procedures

| Copolymer Property | Value Obtained with Copolymer of Example 47 | Example 72 |
|---|---|---|
| appearance | clear, amber | clear, amber |
| % non-volatiles | 70 | 69.1 |
| solution viscosity | 1410 cps | 2720 cps |
| mol. wt. of vinyl copolymer | | |
| $\overline{M}_w$ | 23,000 | 72,500 |
| $\overline{M}_n$ | 8,530 | 9,530 |
| EEW, liquid basis | 800 | 732 |
| EEW, solids basis | 560 | 506 |
| $(\bar{f})_n$ of the copolymer | 3.4 | 4.2 |
| $(\overline{X})_n$ of the copolymer | 0.8 | 1.0 |

The much higher ratio $\overline{M}_w/\overline{M}_n$ in Example 72 results in a doubling of the viscosity (undesirable) with only a slight improvement in copolymer functionality, $(\bar{f})_n$.

I claim:

1. A solvent soluble epoxy-containing composition which comprises the product obtained by reacting in the presence of a suitable quantity of a suitable vinyl polymerization catalyst so as to effect polymerization
   (A) the reaction product obtained by reacting in the presence of a suitable quantity of a suitable catalyst
      (1) at least one material having from greater than 1 to about 4

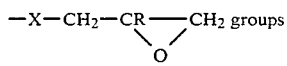

per molecule wherein each R is independently hydrogen or a monovalent hydrocarbon group having from 1 to about 4 carbon atoms; X is —O—, —S— or

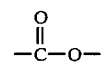

and wherein said material has an epoxide equivalent weight of from about 150 to about 400; and
      (2) at least one of acrylic acid or methacrylic acid; wherein components (1) and (2) are present in a quantity which provides an equivalent ratio of acid groups from component (2) to epoxy groups from component (1) of from about 0.1:1 to less than about 0.5:1; and
   (B) at least one monomer having at least one polymerizable ethylenically unsaturated group per molecule and which optionally contains a hydroxyl or an epoxide group; and
wherein components (A) and (B) are employed in quantities such that the weight ratio of vinyl monomers to epoxy compound varies from about 0.4:1 to about 2.5:1.

2. An epoxy-containing composition of claim 1 wherein
   (i) the equivalent weight of component (A-1) is from about 180 to about 270;
   (ii) the ratio of acid groups from component (A-2) to epoxy groups from component (A-1) is from about 0.2:1 to about 0.3:1; and
   (iii) components (A) and (B) are employed in quantities such that the weight ratio of vinyl monomers to epoxy compound is from about 0.6:1 to about 3.0:1.

3. An epoxy-containing composition of claim 2 wherein
   (i) component (A-1) is a glycidyl ether of an aromatic dihydroxyl-containing compound or a mixture of such glycidyl ethers; and
   (ii) component (B) is styrene, n-butyl acrylate, 2-hydroxyethyl acrylate, 2-hydroxybutyl methacrylate, or a mixture thereof.

4. A curable composition which comprises
(I) an epoxy-containing composition which comprises the product obtained by reacting in the presence of a suitable quantity of a suitable vinyl polymerization catalyst so as to effect polymerization
   (A) the reaction product obtained by reacting in the presence of a suitable quantity of a suitable catalyst
      (1) at least one material having from greater than 1 to about 4

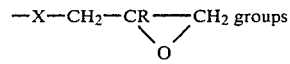

per molecule wherein each R is independently hydrogen or a monovalent hydrocarbon group having from 1 to about 4 carbon atoms; X is —O—, —S— or

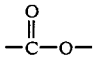

and wherein said material has an epoxide equivalent weight of from about 150 to about 400; and
      (2) at least one of acrylic acid or methacrylic acid; wherein components (1) and (2) are present in a quantity which provides an equivalent ratio of acid groups from component (2) to epoxy groups from component (1) of from about 0.1:1 to about 0.4:1; and (B) at least one monomer having at least one polymerizable ethylenically unsaturated group per molecule and which optionally contains a hydroxyl or an epoxide group; and wherein components (A) and (B) are employed in quantities such that the weight ratio of vinyl monomers to epoxy compound is from about 0.4:1 to about 2.5:1;

(II) optionally a suitable quantity of a suitable solvent system for achieving the desired application viscosity; and (III) an effective quantity of a suitable curing agent and/or catalyst for curing the composition.

5. A curable composition of claim 4 wherein (i) the equivalent weight of component (I-A-1) is from about 180 to about 270;

(ii) the ratio of acid groups from component (I-A-2) to epoxy groups from component (I-A-1) is from about 0.2:1 to about 0.3:1; and (iii) components (I-A) and (I-B) are employed in quantities which provide a weight ratio of vinyl monomers to epoxy compound of from about 6:1 to about 1.5:1.

6. A curable composition of claim 5 wherein (i) component (I-A-1) is a glycidyl ether of an aromatic dihydroxyl-containing compound or a mixture of such glycidyl ethers;

(ii) component (I-B) is styrene, n-butyl acrylate, 2-ethylhexyl acrylate, hydroxyethyl acrylate, hydroxybutyl acrylate, hydroxybutyl methacrylate or a mixture thereof.

* * * * *